United States Patent
Mahurin et al.

(10) Patent No.: US 10,152,101 B2
(45) Date of Patent: Dec. 11, 2018

(54) CONTROLLING VOLTAGE DEVIATIONS IN PROCESSING SYSTEMS

(71) Applicant: QUALCOMM Incorporated, San Diego, CA (US)

(72) Inventors: Eric Wayne Mahurin, Austin, TX (US); Sanjay Bhagawan Patil, Austin, TX (US); Martin Pierre Saint-Laurent, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/860,715

(22) Filed: Sep. 22, 2015

(65) Prior Publication Data

US 2017/0083066 A1 Mar. 23, 2017

(51) Int. Cl.
  *G06F 1/30* (2006.01)
  *G06F 1/32* (2006.01)
  *G06F 1/26* (2006.01)

(52) U.S. Cl.
  CPC .............. *G06F 1/26* (2013.01); *G06F 1/3206* (2013.01); *G06F 1/329* (2013.01); *Y02D 10/24* (2018.01)

(58) Field of Classification Search
  CPC ...... G06F 1/3203; G06F 1/305; G06F 9/3836; G06F 9/3869
  USPC .................................................. 713/300, 320
  See application file for complete search history.

(56) References Cited

U.S. PATENT DOCUMENTS

| | | | |
|---|---|---|---|
| 6,002,878 A | 12/1999 | Gehman et al. | |
| 7,464,278 B2 | 12/2008 | Cohen et al. | |
| 8,020,025 B2 * | 9/2011 | Hyatt | G06F 1/3203 |
| | | | 713/320 |
| 8,024,590 B2 | 9/2011 | Song et al. | |
| 8,060,765 B1 | 11/2011 | Cha et al. | |
| 2003/0126476 A1 | 7/2003 | Greene | |
| 2005/0081073 A1 | 4/2005 | Williams | |
| 2009/0063065 A1 | 3/2009 | Weekly | |
| 2009/0300329 A1 * | 12/2009 | Naffziger | G06F 1/3203 |
| | | | 712/205 |
| 2010/0264983 A1 | 10/2010 | Nation et al. | |
| 2011/0185203 A1 | 7/2011 | Carlson et al. | |

(Continued)

OTHER PUBLICATIONS

Gupta M.S., et al., "An Event-Guided Approach to Reducing Voltage Noise in Processors," Design, Automation & Test in Europe Conference & Exhibition (DATE), 2009, pp. 160-165.

(Continued)

*Primary Examiner* — Michael J Brown
(74) *Attorney, Agent, or Firm* — Muncy, Geissler, Olds & Lowe (57) ABSTRACT

Systems and methods relate to controlling voltage deviations in processing systems. A scheduler receives transactions and to be issued for execution in a pipeline. A voltage deviation that will occur if a particular transaction is executed in the pipeline is estimated before the transaction is issued. Threshold comparators are used to determine if the estimated voltage deviation will exceed specified thresholds to cause voltage overshoots or undershoots. The scheduler is configured to implement one or more corrective measures, such as increasing or decreasing energy in the pipeline, to mitigate possible voltage overshoots or undershoots, before the transaction is issued to be executed in the pipeline.

30 Claims, 4 Drawing Sheets

(56) References Cited

U.S. PATENT DOCUMENTS

2012/0005515 A1 1/2012 Reddi et al.
2015/0378412 A1* 12/2015 Suryanarayanan ... G06F 1/3206
 713/340

OTHER PUBLICATIONS

Pan S., et al., "A Cost-Effective Substantial-Impact-Filter Based Method to Tolerate Voltage Emergencies," Design, Automation & Test in Europe Conference & Exhibition (DATE), 2011, pp. 311-316.
International Search Report and Written Opinion—PCT/US2016/050767—ISA/EPO—dated Nov. 11, 2016.

* cited by examiner

CONTROLLING VOLTAGE DEVIATIONS IN PROCESSING SYSTEMS

FIELD OF DISCLOSURE

Disclosed aspects relate to controlling voltage deviations in processing systems. More specifically, exemplary aspects relate to a scheduler configured to estimate voltage deviations in advance, and implement corrective measures for mitigating voltage overshoots or undershoots, before scheduling transactions.

BACKGROUND

Managing power consumption in processors and microprocessors is an important design consideration. For example, decreased battery life and increased heat generation are examples of problems which arise when power consumption increases, and more specifically, when there are deviations or noise in power distribution across a chip or die on which a processor may be integrated.

Some processors employ voltage regulators and customized power delivery/distribution networks (PDNs) to cater to varying power and voltage values of different components and subsystems on a system-on-chip (SoC). It is desirable to prevent or mitigate voltage and power deviations from occurring during execution of programs on the processor. However, it may be difficult to control such deviations across various programs because different programs can stress components of the SoC differently. The supply current to the various components may vary significantly within very small periods of time. Variation of current is measured in terms of the differential expression dI/dt, where I is current and t is time. For a given inductance L, the voltage drop V is given by the expression $V=L(dI/dt)$. Thus, by controlling dI/dt, it is possible to manage voltage deviations and correspondingly, power fluctuations (since power is $V*I$).

To this end, some efforts for controlling voltage deviations focus on monitoring activity levels of functional blocks of a processor or SoC, for example, during individual clock cycles of the processor. For example, clock gating techniques can be used to turn on or off specific functional blocks based on the specific characteristics of the functional blocks in each clock cycle. The current consumption in active and idle states (i.e., on/off states) for each functional block are known in advance, based on low-level circuit simulations, for example. The processor can include a monitor (which can be implemented using a suitable combination of hardware and/or software), for example, to determine the current consumption of the functional block in a particular clock cycle, based on whether or not a functional block is active in that particular clock cycle. The monitor can determine current consumption of various functional blocks in each clock cycle and add them together to determine the overall current consumption of the processor in a clock cycle. The monitor can be configured to calculate a step response or impulse response (for a given inductance/capacitance of the PDN, for example), to obtain the voltage deviation in a clock cycle.

The monitor may be provided with acceptable maximum/positive and minimum/negative voltage deviation thresholds. If there are voltage overshoots or undershoots relative to the positive or negative voltage deviation thresholds, respectively, the monitor can be configured to react to such overshoots or undershoots. For example, if there is an undershoot relative to the negative voltage deviation threshold (i.e., voltage deviation falls below (or exceeds in a negative direction) the negative voltage deviation threshold), the monitor may cause actions to be taken to reduce current in an attempt to mitigate the voltage deviation. For example, instruction processing may be stalled, clock gating may be implemented, etc. On the other hand, if there is an overshoot relative to the positive voltage deviation threshold (i.e., voltage deviation rises above (or exceeds in a positive direction) the positive voltage deviation threshold), then the monitor may cause actions to be performed which will increase current consumption, such as, introducing dummy operations (e.g., no-operations or "NOPs"), to consume current in an attempt to mitigate the voltage deviation.

Accordingly, the monitor may include a feedback loop or other control systems to react to voltage deviations and implement corrective actions. However, a time delay is incurred from when the voltage deviations occur to when the corrective actions can be implemented. Thus, the processor or SoC may suffer from the negative effects of large voltage deviations in the interim duration from when a voltage deviation occurs to when the system can react and implement corrective measures. This interim duration can be significant in some cases due to the latencies involved in the control logic and feedback paths involved in implementing corrective measures as described above.

Accordingly, there is a need for solutions which can effectively control voltage deviations and power fluctuations without suffering from the aforementioned challenges faced by conventional techniques.

SUMMARY

Exemplary aspects of the invention are directed to systems and methods for controlling voltage deviations in processing systems. In exemplary aspects, a scheduler receives transactions and to be scheduled for execution in a pipeline. A voltage deviation that will occur if a particular transaction is executed in the pipeline is estimated before the transaction is scheduled. Threshold comparators are used to determine if the estimated voltage deviation will exceed specified thresholds to cause voltage overshoots or undershoots. The scheduler is configured to implement one or more corrective measures, such as increasing or decreasing energy in the pipeline, to mitigate possible voltage overshoots or undershoots, before the transaction is scheduled to be executed in the pipeline.

Accordingly, an exemplary aspect is directed to a method of controlling voltage deviation in a processing system, the method comprising estimating a voltage deviation that will occur if a transaction is executed in a pipeline of the processing system, determining if the estimated voltage deviation exceeds a specified threshold, and if the estimated voltage deviation exceeds the specified threshold, implementing one or more corrective measures for mitigating voltage deviation, before issuing the transaction to be executed in the pipeline.

Another exemplary aspect is directed to a processing system comprising a scheduler configured to receive transactions and schedule the transactions to be executed in a pipeline, a filter configured to estimate a voltage deviation that will occur if a transaction is executed in the pipeline, and a threshold comparator to determine if the estimated voltage deviation exceeds a specified threshold, wherein the scheduler is configured to implement one or more corrective measures to mitigate voltage deviation, before the transaction is issued to be executed in the pipeline.

Yet another exemplary aspect is directed to a processing system comprising means for estimating a voltage deviation that will occur if a transaction is executed in a pipeline of the processing system, means for determining if the estimated voltage deviation exceeds a specified threshold, and means for implementing one or more corrective measures to mitigate voltage deviation, before the transaction is issued to be executed in the pipeline if the estimated voltage deviation exceeds a specified threshold.

Yet another exemplary aspect is directed to a non-transitory computer readable storage medium comprising code, which when executed by a processor, causes the processor to perform operations for controlling voltage deviations in a processing system, the non-transitory computer readable storage medium comprising: code for estimating a voltage deviation that will occur if a transaction is executed in a pipeline of the processing system, code for determining if the estimated voltage deviation exceeds a specified threshold, and code for implementing one or more corrective measures for mitigating voltage deviation, before issuing the transaction to be executed in the pipeline if the estimated voltage deviation exceeds the specified threshold.

BRIEF DESCRIPTION OF THE DRAWINGS

The accompanying drawings are presented to aid in the description of aspects of the invention and are provided solely for illustration of the aspects and not limitation thereof.

DETAILED DESCRIPTION

Aspects of the invention are disclosed in the following description and related drawings directed to specific aspects of the invention. Alternate aspects may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any aspect described herein as "exemplary" is not necessarily to be construed as preferred or advantageous over other aspects. Likewise, the term "aspects of the invention" does not require that all aspects of the invention include the discussed feature, advantage or mode of operation.

The terminology used herein is for the purpose of describing particular aspects only and is not intended to be limiting of aspects of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the aspects described herein, the corresponding form of any such aspects may be described herein as, for example, "logic configured to" perform the described action.

In general, disclosed aspects include model predictive controllers (MPCs) which use dynamic process models of a system, such as a processor or a SoC. Using MPCs, activities of a future time slot, for example, can be predicted. Using the predictions of a future time slot, a current time slot under consideration can be managed and optimized. The current and future time slots can be clock cycles of a processor in some cases. Thus, using MPCs, voltage and power deviations of a future clock cycle can be predicted or estimated, and corrective actions can be taken to mitigate the estimated voltage and power deviations.

For example, in aspects of this disclosure, future events are predicted and the predictions are used to mitigate undesirable voltage noise or deviations, power spikes/surges, large current variations, temperature differentials, etc. According to an exemplary aspect, a scheduler of a processor is configured to schedule transactions by looking ahead into an instruction pipeline of the processor and determining whether scheduling future transactions may lead to one or more of the above deviations. The exemplary scheduler can cause corrective measures to be implemented ahead of time such that the predicted deviations can be mitigated.

Figure 1:
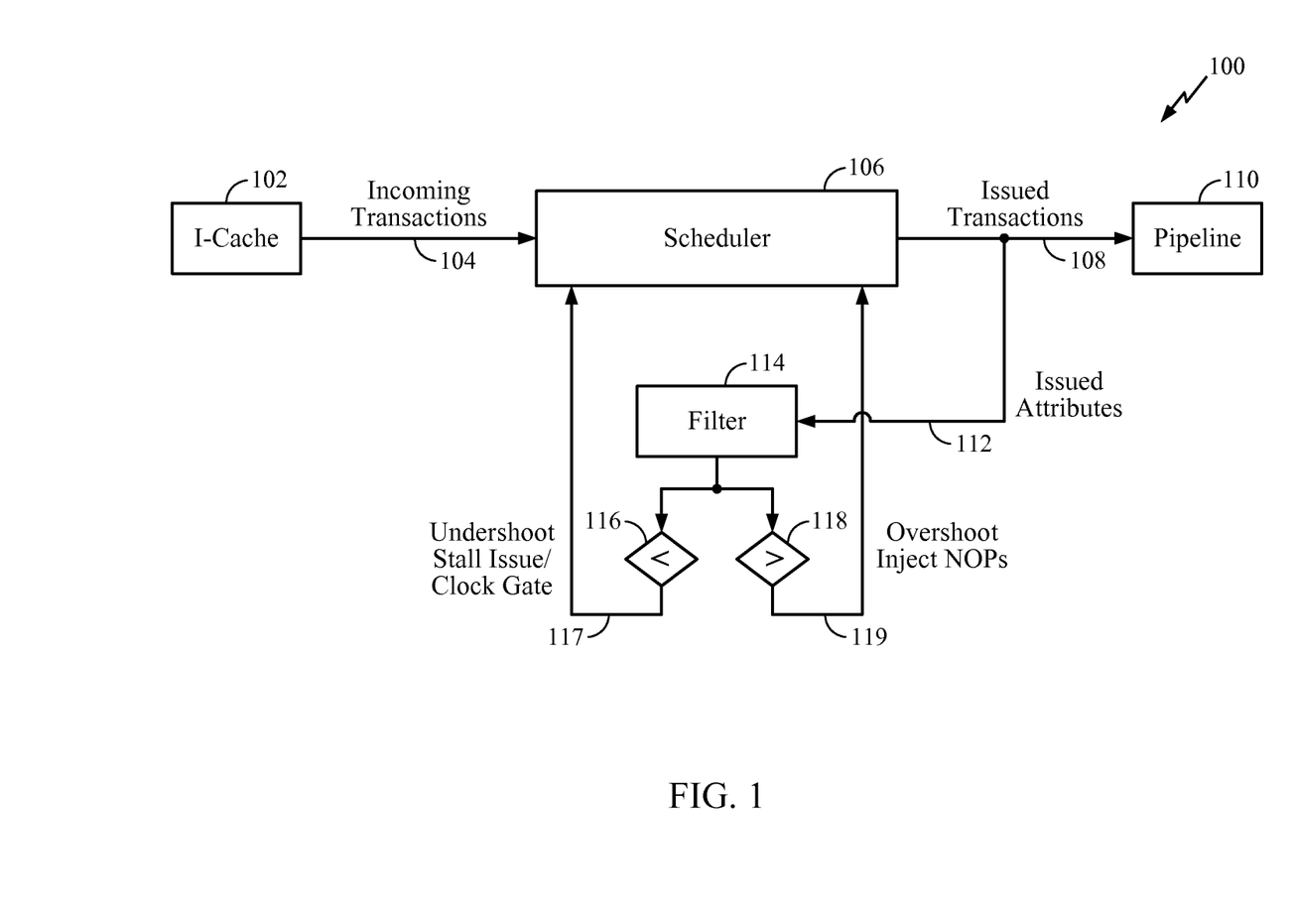
FIG. 1 is a schematic view of a conventional processing system

With reference to FIG. 1, a conventional scheduler will first be described. FIG. 1 illustrates a processing system 100, which can be any general or special purpose processing system (e.g., a digital signal processor (DSP)) or system-on-chip (SoC). Processing system 100 can include a memory structure such as an instruction cache (I-cache) 102 in which instructions can be stored in and from which instructions can be retrieved. In this disclosure, the term "transactions" is used to refer to one or more instructions which can be processed by an instruction pipeline such as pipeline 110. Scheduler 106 is configured to receive instructions or incoming transactions 104 from I-cache 102 and provide issued transactions 108 to be processed in pipeline 110.

Issued transactions 108 provided to pipeline 110 are also monitored to detect whether voltage and power deviations may take place in the implementation or execution of issued transactions 108 in pipeline 110. As previously mentioned, pipeline 110 can include different functional blocks for executing issued transactions 108 in one or more clock cycles. Based on specific characteristics or attributes of individual transactions, it is possible to determine, in advance, which functional blocks will be used, or more specifically, how much current will be consumed across the various clock cycles. Thus, certain attributes (e.g., instruction semantics, operation codes) etc., of issued transactions can be extracted and provided on the bus shown as issued attributes 112 to filter 114. Issued attributes 112 can be used to determine current consumption of corresponding issued transactions 108 during execution of those transactions in pipeline 110.

Filter 114 may be part of the aforementioned monitor, wherein filter 114 may be configured to determine voltage deviation values based on issued attributes 112. For example, filter 114 may be capable of implementing a digital filter, such as a finite impulse response (FIR) filter, infinite impulse response (IIR) filter, step function response, etc., on the current consumption or, more specifically, current variation over time (dI/dt) determined from issued attributes 112, to output a voltage deviation value. Threshold comparators 116 and 118 may be provided to determine if the voltage deviation falls below (or exceeds, in a negative direction), a negative voltage deviation threshold (i.e., voltage falls from a previous value by more than the negative voltage deviation threshold), or if the voltage deviation rises above (or exceeds, in a positive direction) a positive voltage deviation threshold (i.e., voltage rises from a previous value by more than the positive voltage deviation threshold), respectively.

If threshold comparator 116 detects that voltage deviation falls below (or exceeds in the negative direction) the negative voltage deviation threshold, undershoot 117 is said to be detected. Scheduler 106 is provided with a notification of undershoot 117. Scheduler 106 can implement or cause to be implemented, corrective measures such as stalling issue of transactions, causing clock gating to be implemented in pipeline 110, etc., in an attempt to mitigate the negative voltage deviation or undershoot.

If threshold comparator 118 detects that voltage deviation rises above (or exceeds in the positive direction) the positive voltage deviation threshold, overshoot 119 is said to be detected. Scheduler 106 is provided with a notification of overshoot 119. Scheduler 106 can implement or cause to be implemented, corrective measures such as issuing NOPs on issued transactions 108 or causing dummy transactions to be implemented in pipeline 110, in an attempt to reduce the positive voltage deviation or overshoot.

In cases of undershoot 117 and overshoot 119, significant latencies may be involved in generating and providing the notifications to scheduler 106, as well as reacting to these notifications, for example, by causing corrective measures to be implemented. In the interim durations spanning the related latencies, processing system 100 may be subjected to the negative effects of large voltage and power deviations.

Figure 2:
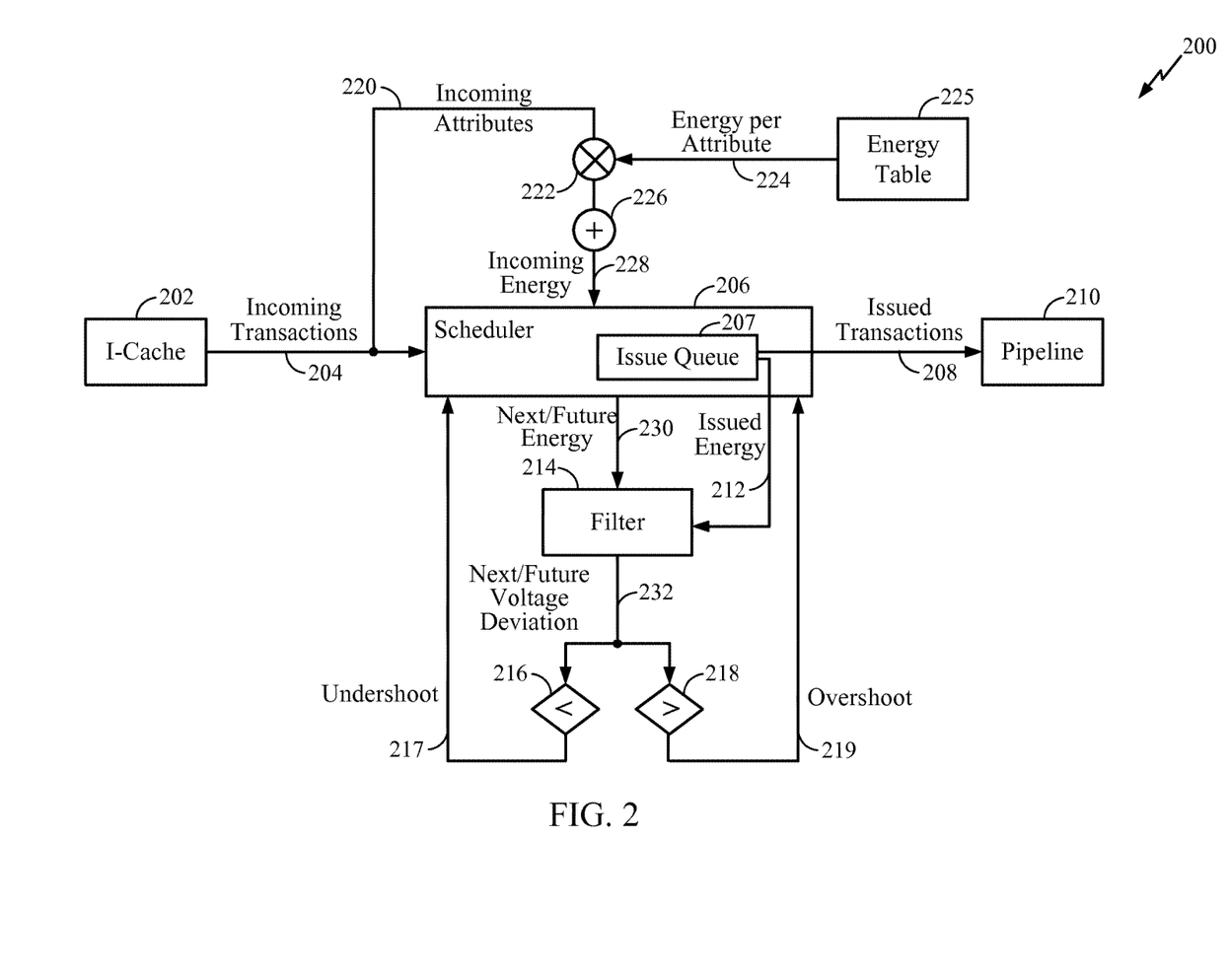
FIG. 2 is a schematic view of an exemplary processing system.

With reference now to FIG. 2, an exemplary processing system 200 is illustrated. Scheduler 206 of processing system 200 may receive incoming transactions 204, for example, from I-cache 202, and scheduler 206 may be configured to provide issued transactions 208 to pipeline 210. In this context, transactions can refer to one or more instructions, programs, or any other task, which, when performed, or executed, may consume energy. In some cases, a transaction can comprise one or more instructions, for example, where processing system 200 may be configured to support superscalar processing or processing of very large instruction word (VLIW) instructions, wherein two or more instructions can be fetched and executed in parallel. Correspondingly, pipeline 210 may comprise a number of functional blocks which can support execution of issued transactions 208 comprising the one or more instructions.

In one implementation of processing system 200, one or more attributes (e.g., semantics, operation codes, etc.) of incoming transactions 204 may be extracted on the bus depicted as incoming attributes 220. For example, a particular incoming transaction 204 may be a VLIW instruction comprising four component arithmetic instructions, such as two multiplication instructions and two addition instructions. The attributes for these four component instructions can include their characteristics of the component instructions such as their operation codes (or "op-codes"), number of operands (e.g., source and destination registers), operation modes (e.g., precision, signed/unsigned, rounding modes, etc.). The energy that will be consumed by pipeline 210 for executing the incoming transaction 204 can be dependent on these attributes.

Accordingly, energy associated with various attributes of transactions can be determined in advance and stored in energy table 225. For example, the energy consumed by pipeline 210 in executing multiplication and addition instructions with various attributes can be determined in advance (e.g., based on an analysis of current consumed by various functional blocks involved for particular attributes) and stored in energy table 225. Determining current usage may be based on low-level circuit simulation models. Clock gating models can be used to determine whether one or more functional blocks (not explicitly illustrated) of pipeline 210 will be turned on or gated off for one or more cycles or pipeline stages in the execution of one or more instructions based on corresponding attributes. Weights can be associated with each of the functional blocks to indicate current consumption in active and idle states. The current consumption or dI/dt for each pipeline stage can be obtained by weighting (multiplying) the consumption of each functional block with corresponding weights and then summing up the products. This provides a distribution of current consumption or dI/dt across the various clock cycles. The energy associated with the current consumption can be determined, for example, based on the resistive load associated with the functional blocks (e.g., based on the formula $E=I^2Rt$, where E is the energy, I is current, R is resistance, and t is a time period over which energy is measured). Accordingly, energy associated with each attribute can be determined, and stored in energy table 225.

Energy table 225 can be indexed by the attributes, and energy per attribute 224 can be obtained from energy table 225 for each attribute in incoming attributes 220. Energy table 225 can be any suitable memory structure (e.g., a read-only memory (ROM)) which can be programmed with energy values and can be indexed, for example, by the corresponding attributes. In some cases, energy table 225 may support multiple ports for looking up and providing two or more energy values for two or more attributes in parallel (and correspondingly, the bus, energy per attribute 224, may comprise two or more buses carrying energy values for two or more attributes of incoming attributes 220).

Multiplier 222 can comprise one or more multipliers configured to multiply or weight each incoming attribute 220 with its corresponding energy value obtained from energy per attribute 224. Adder 226 may be configured to aggregate the energy (e.g., perform a sum of the weighted values or a sum of products) from the one or more multipliers of multiplier 222. The sum of products generated by adder 226 corresponds to incoming energy 228, which represents the cumulative energy of an incoming transaction 204. Scheduler 206 can receive one or more incoming transactions 204 and queue them for issue, along with their corresponding incoming energy 228 in issue queue 207.

Issue queue 207 may comprise one or more entries, with each entry comprising at least an incoming transaction 204 and corresponding incoming energy 228. In implementations where processing system 200 supports in-order processing of transactions, scheduler 206 may issue transactions (on the bus shown as issued transactions 208) to pipeline 210 in the same order that incoming transactions 204 are received. Thus, for in-order processing, issued transactions 208 may be issued from issue queue 207 in the same order that issue queue 207 was filled with incoming transactions 204 (and corresponding incoming energy 228). In some cases, processing system 200 can support out-of-order processing, wherein issued transactions 208 may be issued out of order and the order in which transactions are issued on issued transactions 208 may not correspond to the order in which issue queue 207 was filled with incoming transactions 204 (and corresponding incoming energy 228).

Regardless of whether in-order processing or out-of-order processing is implemented, scheduler 206 may be configured to determine the order in which issued transactions 208 are scheduled from issue queue 207. In other words, if a first transaction is issued on issued transactions 208, scheduler 206 may be configured to select the next transaction, say, second transaction, that will be issued on issued transactions 208, following the first transaction. Similarly, scheduler 206 can determine one or more future transactions that will be issued on issued transactions 208. As previously described, energy corresponding to the issued first transaction as well as energy corresponding to next or future transactions (e.g., the second transaction and one or more future transactions) can also be determined from issue queue 207.

In FIG. 2, the energy corresponding to one or more previously issued transactions (e.g., the already issued first transaction) on issued transactions 208 is shown as issued energy 212, while energy corresponding to next or future transactions is shown as next/future energy 230. In exemplary aspects, possible future voltage deviation can be estimated based on issued energy 212 and next/future energy 230. Considering a simple case for the sake of illustration, if issued energy 212 corresponding to the first transaction and next/future energy 230 corresponding to the second transaction are substantially the same, then issuing the second transaction after the first transaction will not result in a significant deviation in energy consumed by pipeline 210. However, if next/future energy 230 of the second transaction is significantly higher or lower (e.g., by amounts greater than respective positive or negative thresholds) than issued energy 212 of the first transaction, then issuing the second transaction will result in a corresponding significant deviation in energy consumed by pipeline 210. By estimating that the deviation will occur, before scheduling the second transaction, scheduler 206 can implement corrective measures to reduce the deviation, before scheduling the second transaction on issued transactions 208 to be executed in pipeline 210.

In further detail, consider, for example, that a first voltage level is established in pipeline 210 (e.g., based on the voltage of one or more representative nodes, not particularly illustrated, in pipeline 210) upon the first transaction being executed in pipeline 210. Similarly, executing the second transaction may lead to a second voltage level being established in pipeline 210. A positive voltage deviation threshold and a negative voltage deviation threshold are also assumed for the sake of this discussion.

In a first example, the second voltage level may be greater than (or exceed in a positive direction) the first voltage level by an amount which is greater than the positive voltage deviation threshold. In this example, it is assumed the second voltage level causes an overshoot or a positive voltage deviation which is unacceptably high based on the voltage deviation being greater than the positive voltage deviation threshold. To mitigate overshoot, one or more corrective actions can be taken before scheduling the second transaction. An example corrective action can include scheduling one or more intermediate transactions which will bring the voltage level of pipeline 210 to an intermediate voltage level which may be greater than the first voltage level (but not cause a positive voltage deviation greater than the positive voltage deviation threshold). In terms of energy, these intermediate transactions may be referred to as high energy transactions which increase the energy of pipeline 210, leading to a higher intermediate voltage level before the second transaction is scheduled. Thus, when the second transaction is scheduled, any possible positive voltage deviation that may be caused will be relative to the intermediate voltage level (which may be higher than the first voltage level). If the positive voltage deviation of the second voltage level relative to the intermediate voltage level is less than the positive voltage deviation threshold then an unacceptably high positive voltage deviation or overshoot will be avoided when the second transaction is executed in pipeline 210.

A similar technique can be employed to mitigate voltage deviation in the negative direction in a second example, wherein the second voltage level may cause an undershoot, or fall below (or exceed in a negative direction) the first voltage level by an amount which is unacceptably greater than the negative voltage deviation threshold. To mitigate the undershoot in this case, one or more corrective actions can include scheduling one or more intermediate transactions which will bring the voltage level of pipeline 210 to an intermediate voltage level which may be less than the first voltage level (but not cause an acceptably large negative voltage deviation). In terms of energy, these intermediate transactions may be low energy transactions which decrease the energy of pipeline 210, leading to a lower intermediate voltage level before the second transaction is scheduled. Thus, when the second transaction is scheduled, any possible negative voltage deviation that may be caused will be relative to the intermediate voltage level (which may be lower than the first voltage level). If the negative voltage deviation of the second voltage level relative to the intermediate voltage level is less than the negative voltage deviation threshold then an unacceptably large negative voltage deviation or undershoot will be avoided when the second transaction is executed in pipeline 210.

Thus, in the above-described first and second examples, corrective measures can include increasing or decreasing the energy of pipeline 210 to mitigate estimated voltage overshoots or undershoots in pipeline 210 before scheduling the second and further transactions. In some cases, scheduler 206 can also be based, for example, on characteristics of some components of processing systems to remember or retain energy over relatively long periods of time (e.g., several clock cycles) in scheduling the second and future transactions. For example, passive components like inductors and capacitors which may be present in pipeline 210 may store energy which may be released over multiple clock cycles. Therefore, it may be difficult to accurately estimate positive/negative voltage deviations based on a simple comparison of next/future energy 214 and issued energy 212. Accordingly, filter 214 may be provided to improve accuracy.

Filter 214 can be configured to estimate voltage deviation based on knowledge of issued energy 212 and next/future energy 230. Filter 214 may include digital filters such as finite impulse response (FIR), infinite impulse response (IIR), non-linear filters, etc., as known in the art which can be used to obtain voltage deviation based, for example, on simulation models of pipeline 210 used to obtain energy variation as a function of charge (in general it will be recognized that V=E/Q, wherein, V is voltage (e.g., in volts), E is energy (e.g., in joules), and Q is charge (e.g., in coulombs)). Thus, filter 214 can be configured to take into account various sample points of energy (including the energy associated with the first and second transaction) and distribution of charge in pipeline 210, for example, to determine a corresponding voltage deviation. As shown, filter 214 may be configured to determine next/future voltage deviation 232, which is an estimate of voltage deviation that will occur if one or more future transactions with corresponding next/future energy 214 are issued to be executed in pipeline 210.

Correspondingly, processing system 200 can also comprise threshold comparators 216 and 218 to determine if next/future voltage deviation 232 exceeds specified threshold values, or in other words, if scheduling one or more future transactions (e.g., in the order originally determined by scheduler 206 to be scheduled from issue queue 207) will result in significant voltage deviations. As shown, threshold comparators 216 and 218 can notify scheduler 206 (e.g., on buses shown as undershoot 217 and overshoot 219, respectively) if next/future voltage deviation 232 exceeds either a positive voltage deviation threshold (in the positive direction) or a negative voltage deviation threshold (in the negative direction), respectively. In either case, i.e., whether undershoot 217 is reported or whether overshoot 219 is reported, scheduler 206 can implement one or more corrective measures for mitigating the estimated voltage deviation (next/future voltage deviation 232), before scheduling future transactions (e.g., the second transaction) to be executed in pipeline 210. In this manner, scheduler 206 can schedule transactions after having implemented (or cause to have been implemented), corrective measures which will avoid or mitigate overshoots and undershoots. The corrective measures may depend on whether there is an overshoot or undershoot, which will be explained in further detail below.

Threshold comparator 216 is an undershoot threshold comparator configured to determine if next/future voltage deviation 232 falls below (or exceeds in the negative direction) a specified negative voltage deviation threshold. The negative voltage deviation threshold may be based on acceptable voltage deviations for processing system 200, wherein a voltage deviation which falls below the negative voltage deviation threshold may be unacceptable (i.e., the corresponding noise may be significant enough to hurt performance). For example, threshold comparator 216 may comprise a low pass filter, as known in the art, which would report or assert the signal, undershoot 217 if next/future voltage deviation 232 falls below the negative voltage deviation threshold in the negative direction. Undershoot 217 is provided as an input to scheduler 206. Scheduler 206 may implement one or more corrective measures as follows before issuing the second transaction on issued transactions 208 if undershoot 217 is asserted.

As previously discussed, corrective measures for undershoots may include measures to reduce energy of pipeline 210, so that when the second transaction (and maybe one or more additional future transactions) is scheduled, the energy deviation will be low enough to not cause a significant negative voltage deviation. In other words, if energy of pipeline 210 is lowered before the second and future transactions, then the energy deviation, and correspondingly, the negative voltage deviation when the second and future transactions are executed would be lower, and thus, the undershoot can be prevented or mitigated. Thus, corrective measures to reduce energy can include, for example, stalling the issue of transactions on issued transactions 208 for one or more clock cycles.

In some cases, reducing energy can also include issuing low energy transactions from issue queue 207 on issued transactions 208. For example, if there are one or more transactions (e.g., a third transaction) of lower energy than the second transaction that are waiting to be issued on issue queue 207 and processing system 200 supports out-of-order processing, then scheduler 206 may be configured to issue the one or more lower energy transactions before issuing the second transaction, rather than completely stalling the issue of transactions for one or more clock cycles.

After one or more clock cycles of implementing one or more corrective measures as above, next/future voltage deviation 232 may reduce. Correspondingly, threshold comparator 216 can de-assert undershoot 207 once next/future voltage deviation 232 ceases to fall below the negative voltage deviation threshold, and this may be a cue for scheduler 206 to issue the second transaction (and one or more future transactions which may still be waiting to be issued in issue queue 207 and not have been issued out-of-order as discussed above). In this manner, future undershoots may be estimated in advance and corrective measures for reducing energy (e.g., stalling issue of transactions or issuing lower energy transactions from issue queue 207) can mitigate or avoid the future undershoot.

Coming now to threshold comparator 218, threshold comparator 218 is an overshoot threshold comparator configured to determine if next/future voltage deviation 232 rises above (or exceeds in the positive direction) a specified positive voltage deviation threshold. The positive voltage deviation threshold may be based on acceptable voltage deviations for processing system 200, wherein a voltage deviation which rises above the positive voltage deviation threshold may be unacceptable (i.e., the corresponding noise may be significant enough to hurt performance). For example, threshold comparator 218 may comprise a high pass filter, as known in the art, which would report or assert the signal, overshoot 219 if next/future voltage deviation 232 rises above the positive voltage deviation threshold in the positive direction. Overshoot 219 is also provided as an input to scheduler 206. Scheduler 206 may implement one or more corrective measures as follows before issuing the second transaction on issued transactions 208 if overshoot 219 is asserted.

As previously discussed, corrective measures for overshoots may include measures to increase energy of pipeline 210, so that when the second transaction (and maybe one or more additional future transactions) is scheduled, the energy deviation will be low enough to not cause a significant positive voltage deviation. In other words, if energy of pipeline 210 is increased before the second and future transactions are scheduled to be executed, then the energy deviation, and correspondingly, the positive voltage deviation when the second and future transactions are executed would be lower, and thus, the overshoot can be prevented or mitigated. Thus, corrective measures to increase energy can include, for example, issuing dummy operations or NOPs (operations whose results will not be recorded or written into a register file, for example), on issued transactions 208 for one or more clock cycles.

In some cases, increasing energy can also include issuing high energy transactions (e.g., other than the NOPs) from issue queue 207 on issued transactions 208. For example, if there are one or more transactions (e.g., a third transaction) of higher energy than the second transaction that are waiting to be issued on issue queue 207 and processing system 200 supports out-of-order processing, then scheduler 206 may be configured to issue the one or more higher energy transactions before issuing the second transaction.

After one or more clock cycles of implementing one or more corrective measures as above, next/future voltage deviation 232 may reduce. Correspondingly, threshold comparator 218 can de-assert overshoot 209 once next/future voltage deviation 232 ceases to be greater than the positive voltage deviation threshold, and this may be a cue for scheduler 206 to issue the second transaction (and one or more future transactions which may still be waiting to be issued in issue queue 207 and not have been issued out-of-order as discussed above). In this manner, future overshoots may be estimated in advance and corrective measures for increasing energy (e.g., issuing NOPs or higher energy transactions from issue queue 207) can mitigate or avoid the future overshoot.

Although not described in detail, alternative implementations of processing system 200 are possible where some of the functional blocks described with reference to FIG. 2 may be configured differently, without departing from the scope of this disclosure. For example, rather than calculating incoming energy 228 in advance and storing incoming energy 228 in issue queue 207, next/future energy 230 and issued energy 212, for example, can be calculated on the fly, based on accessing energy table 225 using attributes of their corresponding transactions, for example. Such alternative implementations may reduce storage space in issue queue 207 (for storing incoming energy 228) but may incur latencies for calculating next/future energy 230 and issued energy 212 on the fly. Other modifications to processing system 200 can also be made based on particular design considerations for clock speed, system power consumption, etc.

Figure 3:
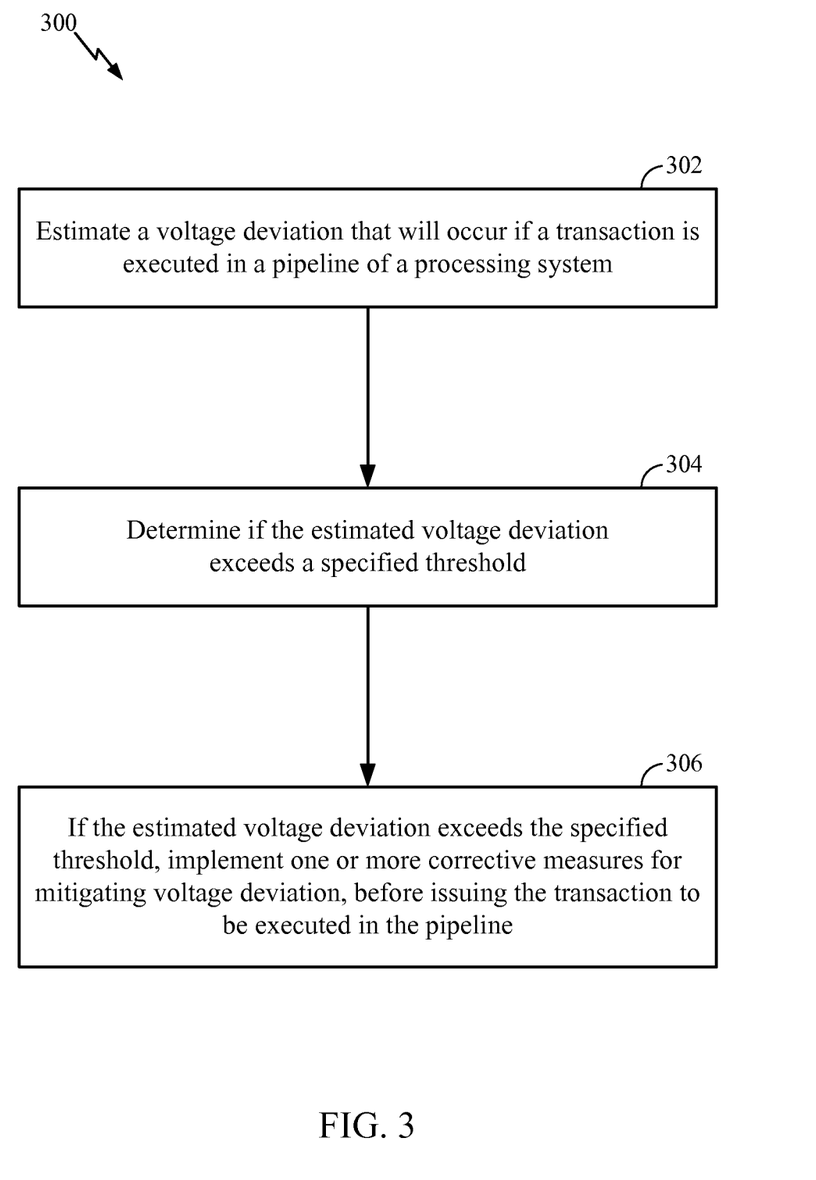
FIG. 3 is a flow-chart depicting a method of controlling voltage deviation in a processing system according to exemplary aspects.

Accordingly, it will be appreciated that aspects include various methods for performing the processes, functions and/or algorithms disclosed herein. For example, as illustrated in FIG. 3, an aspect can include a method 300 of controlling voltage deviation in a processing system (e.g., processing system 200).

In Block 302, method 300 comprises estimating a voltage deviation that will occur if a transaction is executed in a pipeline (e.g., pipeline 210) of the processing system. For example, in Block 302, energy associated with received transactions (e.g., incoming transactions 204 comprising the aforementioned first and second transactions) can be determined, for example, based on one or more incoming attributes 220 of the corresponding received transactions. Energy per attribute 224 can be obtained from energy table 225 and logic (e.g., one or more multipliers of multiplier 222 and adder 226) can be configured to determine incoming energy 228 for incoming transactions 204. Incoming transactions 204 and corresponding incoming energy 228 can be stored in issue queue 207. Voltage deviation that will occur for a transaction (e.g., the second transaction) if the transaction is to be executed in pipeline 210 can be estimated using filter 214 based at least on energy associated with the transaction (e.g., next/future energy 230 of the second and optionally one or more additional future transactions) and energy associated with one or more previously issued transactions (e.g., issued energy 212 of one or more transactions such as the first transaction which were previously issued on issued transactions 208).

Block 304 comprises determining if the estimated voltage deviation exceeds a specified threshold. For example, threshold comparators 216/218 can be used to determine if the estimated voltage deviation exceeds specified minimum/positive voltage deviation thresholds, respectively (e.g., to determine if undershoot 217/overshoot 219 are asserted, respectively).

Block 306 comprises implementing one or more corrective measures for mitigating voltage deviation, before issuing the transaction to be executed in the pipeline if the estimated voltage deviation exceeds the specified threshold. For example, if there is an undershoot 217, the corrective measures can involve reducing energy in pipeline 210 (e.g., stalling issued transactions 208 or clock gating); and if there is an overshoot 219, the corrective measures can involve increasing energy in pipeline 210 (e.g., issuing NOPs on issued transactions 208), before issuing the transaction on issued transactions 208.

In further aspects, it can be determined if the corrective measures implemented in Block 306 were effective, i.e., reduced the voltage deviation, before issuing the transaction (e.g., based on determining if issued energy 212 of issued transactions 208 result in undershoot 217 or overshoot 219 being de-asserted, for corresponding cases where undershoot 217 or overshoot 219 were asserted due to the estimated voltage deviation exceeding respective minimum or positive voltage deviation thresholds).

It will also be appreciated that aspects of this disclosure include various functional blocks or means for performing the functions described herein. For example, means for scheduler 206 in conjunction with energy table 225, filter 214, and related aspects of processing system 200 can comprise means for estimating a voltage deviation that will occur if a transaction is executed in a pipeline of the processing system. Threshold comparators 216 and 218 can comprise means for determining if the estimated voltage deviation exceeds a specified threshold. In exemplary aspects, scheduler 206 (comprising issue queue 207) can also comprise means for implementing one or more corrective measures to mitigate voltage deviation, before the transaction is issued to be executed in the pipeline if the estimated voltage deviation exceeds a specified threshold.

Figure 4:
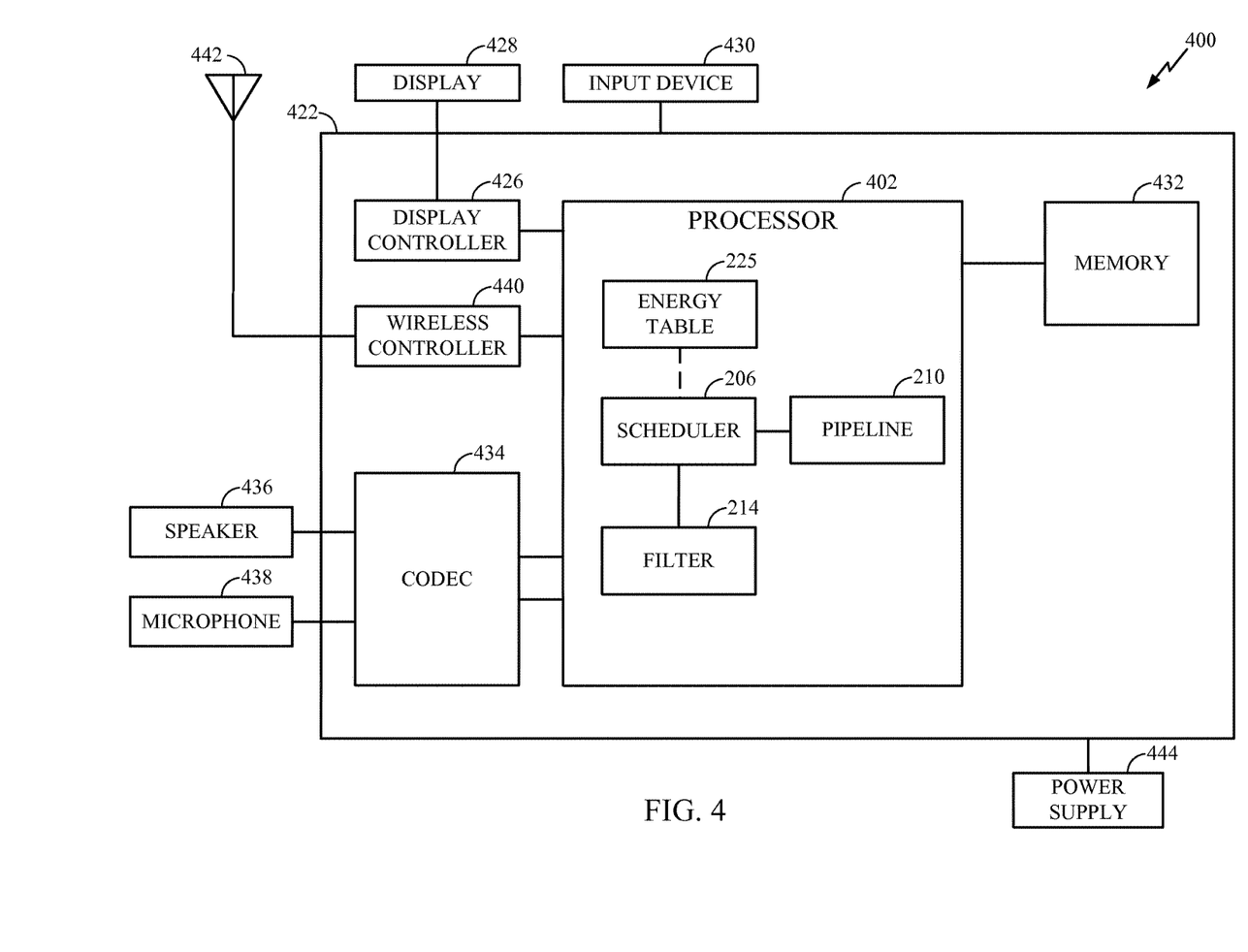
FIG. 4 illustrates an exemplary computing device 400 in which an aspect of the disclosure may be advantageously employed.

In FIG. 4, a block diagram of a particular illustrative aspect of computing device 400 according to exemplary aspects is illustrated. Computing device 400 may be configured to perform method 300 of FIG. 3 in some aspects. Computing device 400 includes system-in-package or system-on-chip device 422 which may be similar to processing system 200 of FIG. 2. Only selected aspects of processing system 200 from FIG. 2 are shown in the representation of computing device 400 in FIG. 4, while other features have been omitted for the sake of clarity. As shown, computing device 400 includes processor 402 which is shown to comprise scheduler 206, energy table 225, filter 214, and pipeline 210 of FIG. 2 (the connection between energy table 225 and scheduler 206 is shown in dashed lines to convey that information from energy table 225 may be used to derive incoming energy 228 which is supplied to scheduler 206 as explained with reference to FIG. 2). It will be noted that the various other functional blocks of processing system 200 and related interconnections, although not illustrated herein, may be implemented in computing device 400. As shown in FIG. 4, processor 402 may be in communication with memory 432. Although not shown, one or more caches (e.g., I-cache 202) or other memory structures may also be included in computing device 400.

FIG. 4 also shows display controller 426 that is coupled to processor 402 and to display 428. Coder/decoder (CODEC) 434 (e.g., an audio and/or voice CODEC) can be coupled to processor 402. Other components, such as wireless controller 440 (which may include a modem) are also illustrated. Speaker 436 and microphone 438 can be coupled to CODEC 434. FIG. 4 also indicates that wireless controller 440 can be coupled to wireless antenna 442. In a particular aspect, processor 402, display controller 426, memory 432, CODEC 434, and wireless controller 440 are included in the aforementioned system-in-package or system-on-chip device 422.

In a particular aspect, input device 430 and power supply 444 are coupled to the system-on-chip device 422. Moreover, in a particular aspect, as illustrated in FIG. 4, display 428, input device 430, speaker 436, microphone 438, wireless antenna 442, and power supply 444 are external to the system-on-chip device 422. However, each of display 428, input device 430, speaker 436, microphone 438, wireless antenna 442, and power supply 444 can be coupled to a component of the system-on-chip device 422, such as an interface or a controller.

It should be noted that although FIG. 4 depicts a wireless communications device, processor 402 and memory 432 may also be integrated into a set-top box, a music player, a video player, an entertainment unit, a navigation device, a personal digital assistant (PDA), a fixed location data unit, or a computer. Further, at least one or more exemplary aspects of computing device 400 may be integrated in at least one semiconductor die.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the invention can include a computer readable media embodying a method of operating a processor, and more specifically, controlling voltage deviations in the processor. Accordingly, the invention is not limited to illustrated examples and any means for performing the functionality described herein are included in aspects of the invention.

While the foregoing disclosure shows illustrative aspects of the invention, it should be noted that various changes and modifications could be made herein without departing from the scope of the invention as defined by the appended claims. The functions, steps and/or actions of the method claims in accordance with the aspects of the invention described herein need not be performed in any particular order. Furthermore, although elements of the invention may be described or claimed in the singular, the plural is contemplated unless limitation to the singular is explicitly stated.

What is claimed is:

1. A method of controlling voltage deviation in a processing system, the method comprising:

estimating a voltage deviation that will occur if a transaction is executed in a pipeline of the processing system, wherein the processing system supports out-of-order processing of transactions;

determining if the estimated voltage deviation exceeds a specified threshold; and if the estimated voltage deviation exceeds the specified threshold, implementing one or more corrective measures for mitigating voltage deviation, before issuing the transaction to be executed in the pipeline, wherein the one or more corrective measures comprise issuing at least one out-of-order transaction.

2. The method of claim 1, comprising estimating the voltage deviation based on at least the energy associated with the transaction and energy associated with one or more transactions previously issued to be executed in the pipeline.

3. The method of claim 2, comprising determining the energy associated with the transaction based on one or more attributes of the transaction.

4. The method of claim 3, further comprising determining energy values associated with each of the one or more attributes from a table and adding the energy values of the one or more attributes.

5. The method of claim 1, comprising determining that the estimated voltage deviation is an undershoot if the estimated voltage deviation exceeds a negative voltage deviation threshold in a negative direction.

6. The method of claim 5, wherein the at least one out-of-order transaction has a lower energy than the transaction to be executed in the pipeline, and wherein implementing the one or more corrective measures comprises reducing energy of the pipeline.

7. The method of claim 6, wherein the one or more corrective measures further comprise stalling issuing of transactions to be executed in the pipeline.

8. The method of claim 6, further comprising determining if implementing the one or more corrective measures mitigated the voltage deviation, before scheduling the transaction.

9. The method of claim 1, comprising determining that the estimated voltage deviation is an overshoot if the estimated voltage deviation exceeds a positive voltage deviation threshold in a positive direction.

10. The method of claim 9, wherein the at least one out-of-order transaction has a higher energy than the transaction to be executed in the pipeline, and wherein implementing the one or more corrective measures comprises increasing energy of the pipeline.

11. The method of claim 10, wherein the one or more corrective measures further comprise issuing dummy transactions or no-operations (NOPs) to be executed in the pipeline.

12. The method of claim 10, further comprising determining if implementing the one or more corrective measures mitigated the voltage deviation, before scheduling the transaction.

13. A processing system comprising:
a scheduler configured to receive transactions and issue the transactions to be executed in a pipeline, wherein the processing system supports out-of-order processing of the transactions;
a filter configured to estimate a voltage deviation that will occur if a transaction is executed in the pipeline; and
a threshold comparator to determine if the estimated voltage deviation exceeds a specified threshold,
wherein the scheduler is configured to implement one or more corrective measures to mitigate voltage deviation, before the transaction is issued to be executed in the pipeline, wherein the one or more corrective measures comprise issuing at least one out-of-order transaction.

14. The processing system of claim 13, wherein the scheduler comprises an issue queue configured to store one or more received transactions and corresponding energy associated with the one or more received transactions.

15. The processing system of claim 14, further comprising logic configured to determine the energy associated with the one or more received transactions based on one or more attributes of the one or more received transactions.

16. The processing system of claim 15, further comprising a table comprising energy values associated with each of the one or more attributes, wherein the logic is configured to determine the energy values associated with the one or more attributes from the table and add the energy values associated with the one or more attributes.

17. The processing system of claim 13, wherein the filter is configured to estimate the voltage deviation based at least on energy associated with the transaction and energy associated with one or more transactions previously issued to be executed in the pipeline.

18. The processing system of claim 13, wherein the threshold comparator is an undershoot threshold comparator configured to determine that the estimated voltage deviation is an undershoot if the estimated voltage deviation exceeds a negative voltage deviation threshold in a negative direction.

19. The processing system of claim 18, wherein the at least one out-of-order transaction has a lower energy than the transaction to be executed in the pipeline, and wherein the scheduler is configured to reduce energy in the pipeline based on the one or more corrective measures being implemented.

20. The processing system of claim 19, wherein the scheduler is configured to stall the issue of transactions to be executed in the pipeline.

21. The processing system of claim 18, wherein the scheduler is configured to schedule the transaction if the one or more corrective measures mitigated the voltage deviation.

22. The processing system of claim 13, wherein the threshold comparator is an overshoot threshold comparator configured to determine that the estimated voltage deviation is an overshoot if the estimated voltage deviation exceeds a positive voltage deviation threshold in a positive direction.

23. The processing system of claim 22, wherein the at least one out-of-order transaction has a higher energy than the transaction to be executed in the pipeline, and wherein the scheduler is configured to increase energy in the pipeline based on the one or more corrective measures being implemented.

24. The processing system of claim 23, wherein the scheduler is configured to issue dummy transactions or no-operations (NOPs) to be executed in the pipeline.

25. The processing system of claim 13, wherein the scheduler is configured to schedule the transaction if the one or more corrective measures mitigated the voltage deviation.

26. The processing system of claim 13, integrated into a device selected from the group consisting of a set top box, music player, video player, entertainment unit, navigation device, communications device, personal digital assistant (PDA), fixed location data unit, and a computer.

27. A processing system comprising:
means for estimating a voltage deviation that will occur if a transaction is executed in a pipeline of the processing system, wherein the processing system supports out-of-order processing of transactions;
means for determining if the estimated voltage deviation exceeds a specified threshold; and
means for implementing one or more corrective measures comprising issuing at least one out-of-order transaction, to mitigate voltage deviation, before the transaction is issued to be executed in the pipeline if the estimated voltage deviation exceeds the specified threshold.

28. The processing system of claim 27, comprising the means for estimating the voltage deviation based at least on energy associated with the transaction and energy associated with one or more transactions previously issued to be executed in the pipeline.

29. The processing system of claim 27, comprising means for determining energy associated with the transaction based on one or more attributes of the transaction.

30. A non-transitory computer readable storage medium comprising code, which when executed by a processor, causes the processor to perform operations for controlling voltage deviations in a processing system, the non-transitory computer readable storage medium comprising:
code for estimating a voltage deviation that will occur if a transaction is executed in a pipeline of the processing system, wherein the processing system supports out-of-order processing of transactions;
code for determining if the estimated voltage deviation exceeds a specified threshold; and
code for implementing one or more corrective measures comprising issuing at least one out-of-order transaction, for mitigating voltage deviation, before issuing the transaction to be executed in the pipeline if the estimated voltage deviation exceeds the specified threshold.

* * * * *